United States Patent [19]

Hailey

[11] Patent Number: 4,519,238

[45] Date of Patent: May 28, 1985

[54] APPARATUS FOR INTERNALLY TESTING A PLURALITY OF INTERCONNECTED PIPE SECTIONS

[76] Inventor: Charles D. Hailey, P.O. Box 26063, Oklahoma City, Okla. 73126

[21] Appl. No.: 489,591

[22] Filed: Apr. 28, 1983

[51] Int. Cl.³ .............................................. G01M 3/08
[52] U.S. Cl. .................................... 73/40.5 R; 73/49.5
[58] Field of Search .................... 73/40.5 R, 49.1, 49.5

[56] References Cited

U.S. PATENT DOCUMENTS

| | | | |
|---|---|---|---|
| 2,841,007 | 7/1958 | Loomis | 73/40.5 R |
| 2,953,919 | 9/1960 | Potts | 73/49.1 |
| 2,998,721 | 9/1961 | Gawlik | 73/40.5 R |
| 3,008,521 | 11/1961 | Boucher | 166/250 |
| 3,059,699 | 10/1962 | Brown | 166/187 |
| 3,165,918 | 1/1965 | Loomis | 73/40.5 R |
| 3,165,920 | 1/1965 | Loomis | 73/40.5 R |
| 3,199,598 | 8/1965 | Loomis | 73/49.1 |
| 3,333,459 | 8/1967 | Claycomb | 73/40.5 |
| 3,354,697 | 11/1967 | Wilkerson | 73/40.5 R |
| 3,420,095 | 1/1969 | Brown et al. | 73/40.5 R |
| 3,478,577 | 11/1969 | Hauk | 73/49.1 |
| 3,499,485 | 3/1970 | Phillips | 166/67 |
| 3,503,249 | 3/1970 | Dumond | 73/49.1 |
| 3,899,920 | 8/1975 | Matherne | 73/49.5 R |
| 4,081,990 | 4/1978 | Chatagnier | 73/49.1 |
| 4,083,230 | 4/1978 | Rome, Sr. et al. | 73/40.5 R |
| 4,322,969 | 4/1982 | Ball et al. | 73/40.5 R |

FOREIGN PATENT DOCUMENTS 2443627  4/1976  Fed. Rep. of Germany ....... 73/49.1

*Primary Examiner*—Anthony V. Ciarlante
*Assistant Examiner*—Hezron E. Williams
*Attorney, Agent, or Firm*—Browning, Bushman, Zamecki & Anderson

[57] ABSTRACT

An apparatus and method suitable for simultaneously testing the integrity of the joints and walls of a plurality of interconnected pipe sections is disclosed. Further, the present invention includes a method and apparatus for sequentially setting at different pressures the packers of such a device. A further feature of the present invention is the actuation of the pressurizing of an annular pipe section testing chamber by the setting of a packer adjacent to the chamber.

20 Claims, 9 Drawing Figures

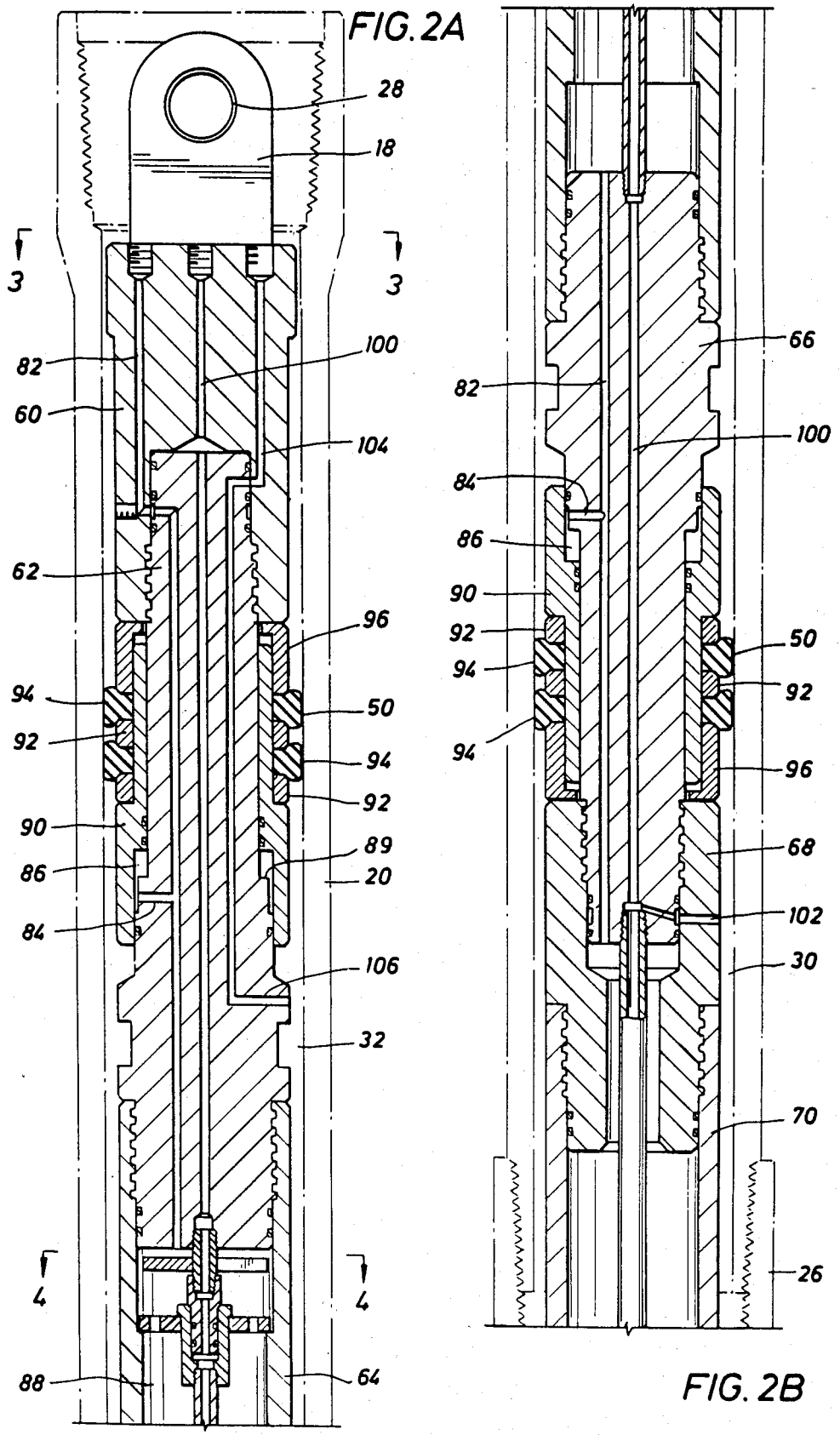

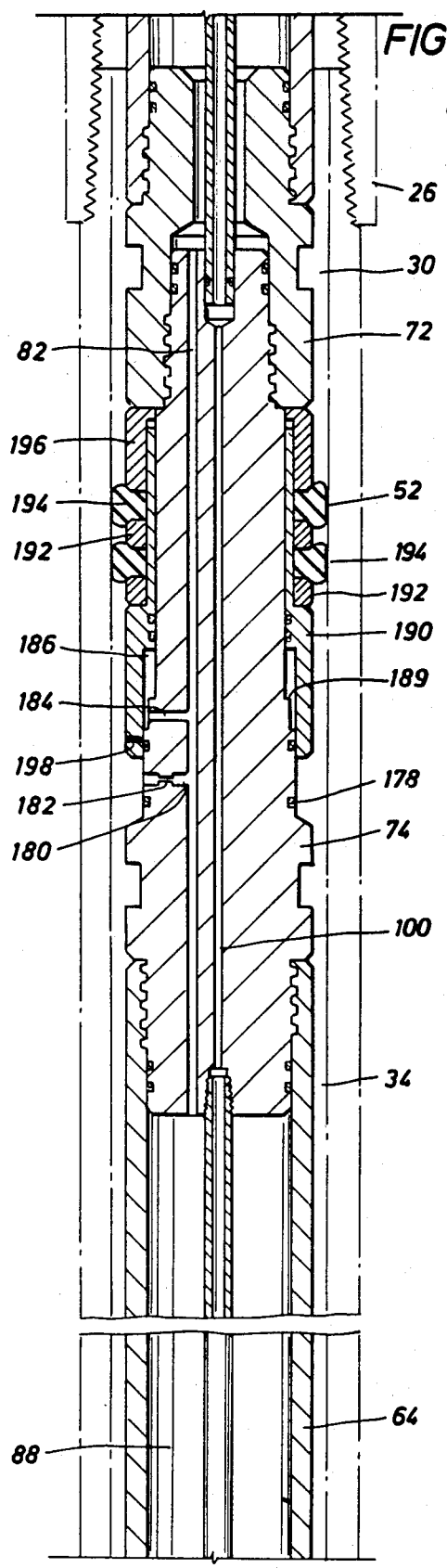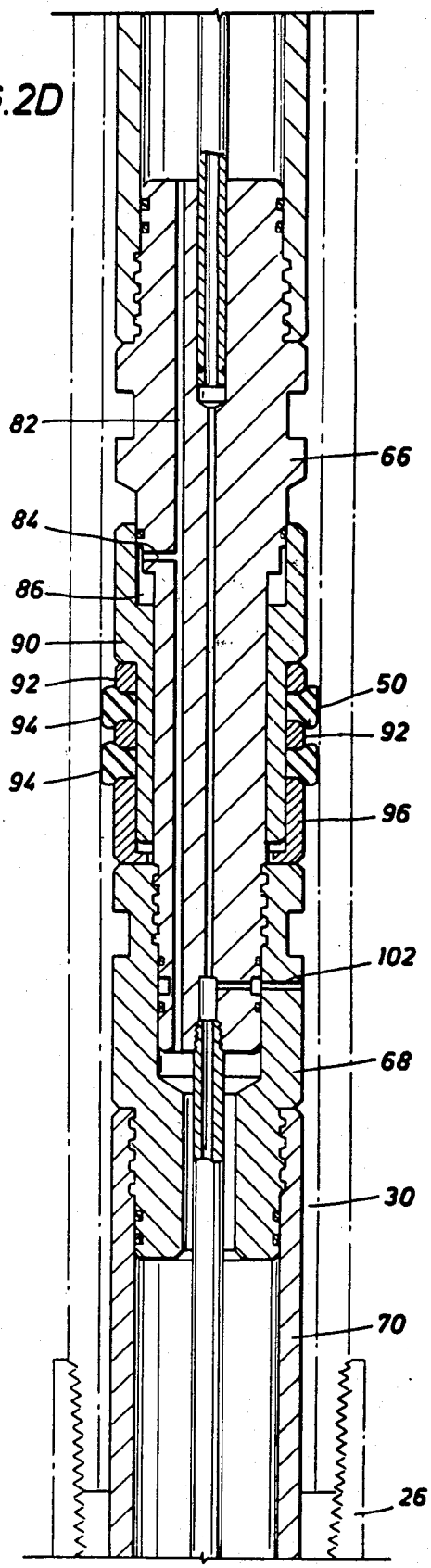

APPARATUS FOR INTERNALLY TESTING A PLURALITY OF INTERCONNECTED PIPE SECTIONS

BACKGROUND OF THE INVENTION

1. Field of the Invention

The present invention relates to an apparatus and method for testing the integrity of the walls and joints of a plurality of interconnected pipe sections. More particularly, an apparatus, comprising an internal testing device constructed of a plurality of tool sections and designed to permit repetitive use of an essentially identical intermediate section to provide a tool capable of testing any desired number of interconnected pipe sections is disclosed. The device of the present invention simultaneously and independently determines the integrity of joints and pipe sections in a plurality of interconnected pipe sections. The device and method of the present invention is conveniently employed to simultaneously test two or three interconnected pipe sections prior to the lowering of these sections into a borehole.

2. Description of the Background

Pressure testing of tubing and pipe sections and particularly of the joints therebetween prior to placement of the pipe into a borehole is required in order to determine the presence of leaks in the pipe section walls or joints. Such testing may be conducted using an external testing tool or an internal testing tool.

An external testing tool generally comprises a cylindrical apparatus having a diameter substantially greater than that of the pipe to be tested. This tool includes appropriately positioned packers on the inside thereof. An internal tool may be lowered about the pipe section and uppermost joint, or may be formed in multiple parts which may be placed around the pipe and/or joint. Testing is achieved by activating the packers and pressurizing the annular space between the pipe or joint and the testing tool with a testing fluid at a known pressure. Leaks may be easily determined by an observable drop in pressure.

Various internal testing tools have also been employed. These tools generally include a cylindrical body having a diameter substantially less than that of the pipe to be tested and having packers on the exterior thereof. Such an internal testing tool is lowered into the interior of the top pipe section to test the integrity of the top pipe or first joint. Setting of the packers and pressurization of the annular space resulting between the interior of the pipe, the exterior of the tool and the packers provides a pressurized test chamber. Again, leaks are easily detected by an observable decrease in the predetermined pressure.

These known testing methods and apparatus have suffered from the ability to provide test results with respect to only one pipe section or joint at a time. The loading of a long pipe string into a borehole, particularly in deep well operations, is extremely time consuming. It is necessary to be sure that there are no leaks in the joints or in the pipe sections themselves. Accordingly, it is necessary to test each and every joint and pipe section. The above known methods require the testing of each pipe section individually as it is added, and greatly increases the time required to make-up, test and move the string into the borehole. The make-up, testing and loading of the pipe string becomes very costly in deep well operations. Accordingly, it would be desirable to test stands of interconnected pipe simultaneously to decrease the time required for pressure testing the drill string.

The present invention overcomes this major difficulty by providing an apparatus and method capable of testing simultaneously and independently the joints and pipe walls of a plurality of interconnected pipe sections. It is most convenient to test two or three sections of pipe in a single stand. The typical height of the derrick permits the convenient manipulation of two or three sections of interconnected pipe in most operations. The time required for testing pipe sections is typically cut by fifty to sixty-seven percent when employing the method and apparatus of the present invention. These savings in time produce significant savings in cost in drilling operations, and are particularly beneficial in deep drilling operations where the tripping of the drill string may consume many hours.

SUMMARY OF THE INVENTION

The present invention provides an apparatus and method for simultaneously testing the integrity of the pipe walls and joints of a plurality of interconnected pipe sections. The device comprises an internal pressure testing tool useful for simultaneously pressure testing a plurality of interconnected pipe sections. Conveniently, the device and method are preferably used to test the pipe joints and the walls of two or three interconnected pipe sections simultaneously.

A device in accordance with the present invention includes an elongated conduit, generally of cylindrical shape and having an outer diameter substantially smaller than the inner diameter of the pipe sections into which it is to be introduced to provide a radial clearance therebetween. The device further includes a plurality of packers associated longitudinally along the elongated conduit and also normally having outer diameters substantially smaller than the inner diameter of the pipe sections to facilitate longitudinal movement of the packers and conduit within and relative to the pipe sections. The packers are of appropriate size and shape so that when expanded they provide a seal against the interior of the pipe section to produce a plurality of generally annular chambers between the testing apparatus and the pipe. Alternate annular chambers are appropriately sized and spaced for testing the integrity of the pipe joints and the pipe section walls. The packers are appropriately spaced in relation to the pipe to be tested for producing a plurality of generally annular testing chambers, some of appropriate size and location to provide separate annular chambers for testing the integrity of each pipe joint and others for testing the integrity of the major portion of each pipe section wall. In a preferred embodiment, the packers are positioned so that relatively short chambers are produced for testing the pipe joint areas and relatively long chambers are produced for testing the pipe wall sections.

The elongated conduit includes one or more fluid passageways to provide passage of fluid therethrough in order to expand and set the packers and to provide pressurizing fluid to the generally annular testing chambers produced by the setting of the tool within the pipe to be tested. In a preferred embodiment, a single longitudinal fluid passageway with appropriately spaced generally radial passageways provides a fluid communication system for both setting the packers and testing the integrity of the pipe section walls. A second longitudinal fluid passageway with appropriate generally radial passageways provides a second fluid communication system for testing the integrity of the pipe joint areas.

In another aspect of the present invention, the testing device and method include packers set at different fluid pressures. In this embodiment, low pressure packers are set at a first predetermined fluid pressure followed by the setting of high pressure packers at a second, higher predetermined fluid pressure. In a further refinement, pressurizing of the annular chambers formed adjacent certain packers is actuated by the setting of those packers.

In a preferred embodiment of the present invention, the testing device comprises a plurality of interconnected conduit sections, including a top section, a bottom section and one or more identical intermediate sections. In this preferred embodiment, the intermediate sections each include two packers, one being set at a first predetermined pressure and the other being set at a second, higher predetermined pressure. These packers are arranged generally in close relation to one another so that the annular testing chamber formed therebetween is appropriately used to test the integrity of a pipe joint. These intermediate sections further include appropriate fluid passageways to set the packers and to conduct testing fluids through the sections and to the area between one packer, preferably the packer set at a higher pressure, and the end of the section. By using one or more of these essentially identical intermediate sections, together with a top and bottom section, the pipe joints and associated pipe walls of two or more interconnected pipe sections are simultaneously tested. In a preferred embodiment, one or two of these intermediate sections are employed to provide a tool capable of testing simultaneously the joints and pipe wall sections of two or three interconnected pipe sections.

A tool designed to test two or three interconnected pipe sections are conveniently used with standard derricks and draw works. Although any number of intermediate sections could be used to simultaneously test the joints and walls of even larger numbers of interconnected pipe sections, such testing becomes impractical because of the height of the derrick and draw works which would be required.

The present method further includes means for setting some of the packers, preferably the bottom packers of each pipe wall testing annular chamber, prior to the setting of the top packers and introduction of testing fluid to the annular testing chamber. This configuration ensures that pressure testing fluid used in testing the pipe walls does not invade the annular chamber used to test the pipe joints.

The apparatus and method of the present invention briefly summarized above provides significant advantages over that conventionally used in the pressure testing of pipe sections. The present method and apparatus provides a means of simultaneously testing the integrity of both the pipe joints and the pipe walls of a plurality of interconnected pipe sections. This method and apparatus significantly reduces the testing time required to test an entire pipe string and is particularly useful in deep well operations.

These and other meritorious features and advantages of the present invention will be more fully appreciated from the following detailed description and claims.

BRIEF DESCRIPTION OF THE DRAWINGS

Other features and intended advantages of the invention will be more readily apparent by reference to the following detailed description in connection with the accompanying drawings wherein:

FIGS. 2A-2E are cross-sectional views of an internal testing tool in accord with the present invention;

FIG. 2A is a cross-sectional view of the top portion of an internal testing tool in accord with the present invention;

FIGS. 2B and 2C are cross-sectional views of the intermediate section of an internal testing tool in accord with the present invention;

FIGS. 2D and 2E are cross-sectional views of the lower section of an internal testing tool in accord with the present invention;

While the invention will be described in connection with a presently preferred embodiment, it will be understood that it is not intended to limit the invention to that embodiment. On the contrary, it is intended to cover all alternatives, modifications and equivalents as may be included within the spirit of the invention as defined in the appended claims.

DETAILED DESCRIPTION OF THE PREFERRED EMBODIMENT

Figures 1, 5:
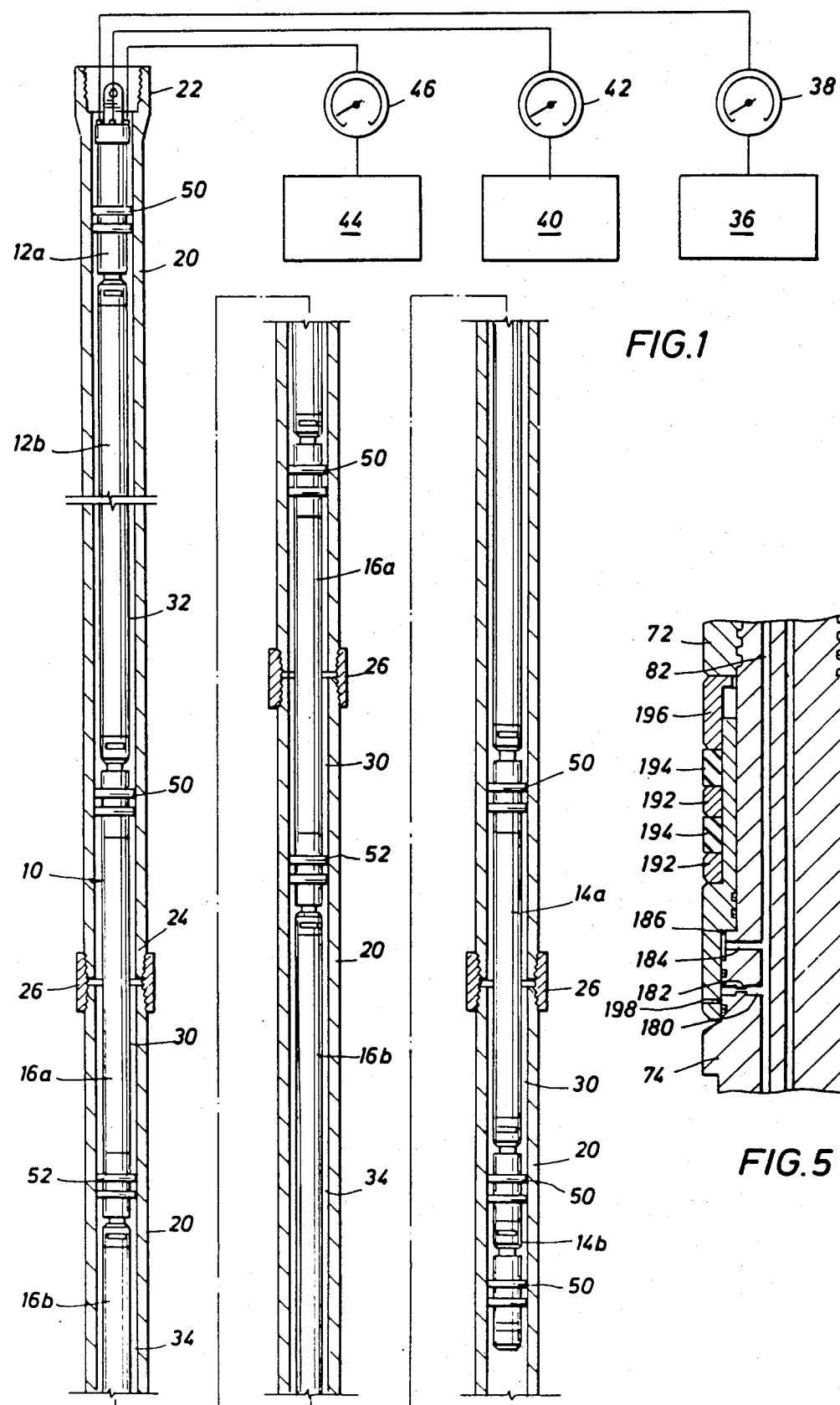
FIG. 1 is an elevational view of an internal testing tool in accord with the present invention and located within a plurality of interconnected pipe sections.
FIG. 5 is a cross-sectional view of a packer assembly in accord with the present invention wherein the packer is in an unexpanded configuration and illustrating the means by which the expanded packer actuates the pressurization of the adjacent annular test chamber.

Referring now to FIG. 1, there is generally illustrated a pressure testing apparatus 10 in accord with the present invention. Apparatus 10 is illustrated having a top unit comprising packer section 12a and extension section 12b. The apparatus further includes a bottom unit comprising joint packer section 14a and bottom packer section 14b. The testing apparatus illustrated in FIG. 1 includes two identical intermediate units, each including joint packer section 16a and extension section 16b. The apparatus illustrated in FIG. 1 is useful in simultaneously pressure testing three pipe sections and three joints. Elimination of one intermediate unit comprising both sections 16a and 16b would result in a pressure testing apparatus useful in testing two pipe sections and two associated joints. Insertion of additional intermediate units comprising both sections 16a and 16b would provide an apparatus having the capability of pressure testing additional pipe sections and joints.

The apparatus illustrated in FIG. 1 includes a plurality of packers 50 and 52. In a preferred embodiment, packers 50 are expanded and set at a given predetermined pressure. Packers 52 are expanded and set at a second and higher predetermined pressure.

Test apparatus 10 is illustrated disposed within the upper portion of a pipe stand including three pipe sections 20 having three connections, couplings, collars or the like 26. Pipe sections 20 include box ends 22 and pin ends 24. When apparatus 10 is so disposed with packers 50 and 52 expanded and set against the interior walls of pipe sections 20, a plurality of generally annular testing chambers 30, 32 and 34 are produced. Annular test chambers 30 are preferably relatively short and located about joints 26 for testing the integrity of the joint. Longer test chamber 32 is located along the wall portion of the first or uppermost pipe section 20 while a plurality of similar longer test chambers 34 are located along the walls of lower pipe sections. Test chambers 32 and 34 are useful in determining the integrity of the pipe walls of pipe sections 20.

Test apparatus 10 illustrated in FIG. 1 includes conventional fluid pressurizing systems 36, 40 and 44 comprising an appropriate fluid source and pressurizing pump associated with three different fluid passageways within the test apparatus. In one embodiment, pressurizing system 36 provides a liquid hydraulic fluid, e.g., water, useful in setting packers 50 and 52 to the packer setting chambers. System 40 provides a pressure testing fluid, e.g., a single phase inert gas such as nitrogen, for pressurizing annular testing chambers 30 for testing the integrity of joints 26. Pressurizing system 44 provides a second pressure test fluid, e.g., water, for pressurizing annular test chambers 32 and 34 for testing the integrity of the pipe section walls. Systems 36, 40 and 44 include respectively visual readouts 38, 42 and 46, for providing an easily observed visual readout of the fluid pressure in each system. A drop in this pressure after pressurization indicates leakage of the pressure testing fluid and indicates a failure in one or more of the appropriate joints or pipe section walls.

In a preferred embodiment, pressurizing system 36 is used both to set packers 50 and 52 and to pressurize at a known pressure annular testing chambers 34. System 40 provides nitrogen at a known pressure to annular chambers 30 for testing joints 26. System 44 simply provides a pressure testing fluid, preferably water, to upper chamber 32 for testing the integrity of the wall of upper pipe 20.

Figure 2E:
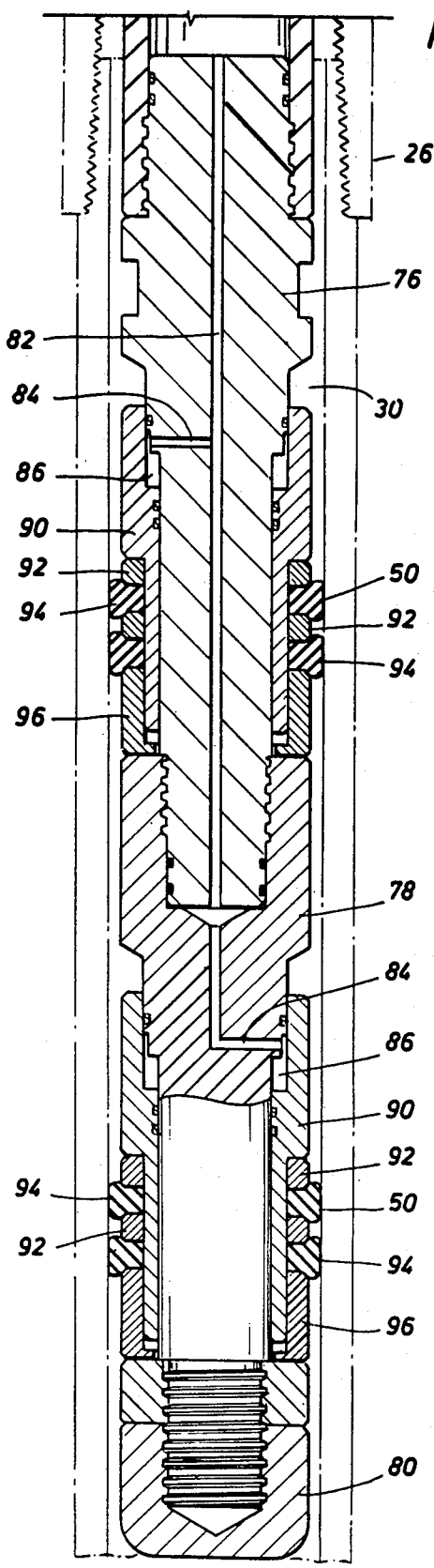
Figure 3:
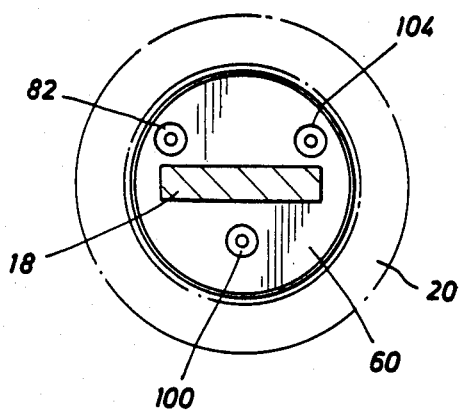
FIG. 3 is a transverse, sectional view along the plane passing through section 3—3 of FIG. 2A illustrating the top of the top mandrel section of an internal testing tool in accord with the present invention and a plurality of fluid passageways therethrough.
Figure 4:
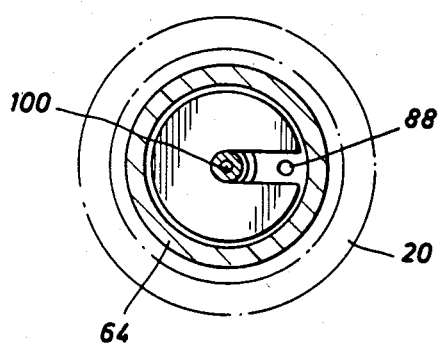
FIG. 4 is a transverse, sectional view along the plane passing through section 4—4 of FIG. 2A illustrating the fluid flow passageways therethrough.

Referring now to FIGS. 2A-2E, a more detailed description of the presently preferred embodiment of the present invention will be provided. FIGS. 2A-2E illustrate pressure testing apparatus 10 disposed within the upper portion of a drill string including a plurality of interconnected drill pipe sections 20 and joints 26. Packers 50 and 52 are in the set position in the illustrations producing a plurality of generally annular test chambers 30, 32 and 34 between the test apparatus and the interior of the drill pipe sections. The illustration shows testing apparatus 10 arranged to test simultaneously the integrity of the pipe section walls and joints of two interconnected pipe sections. A device in accord with the present invention useful for testing three or more interconnected pipe sections is constructed by inserting the device as illustrated in FIGS. 2B and 2C the desired number of times between the device as illustrated in FIGS. 2C and 2D as is discussed in more detail hereinafter.

An internal testing tool in accord with the present invention comprises a conduit means, preferably comprising a series of threadedly interconnected mandrels and sleeves having thereon a plurality of packers positioned so as to produce in cooperation with the interior of the pipe sections to be tested a plurality of appropriately configured annular testing chambers for simultaneously testing the integrity of both the pipe joints and the pipe wall sections of a plurality of interconnected pipe sections 20. The illustrated device includes upper mandrel 60 having attached thereto tool head 18 including bore 28 for attachment of the device to a wireline (not illustrated). The device is suspended from a lift cable or wireline attached through bore 28 of tool head 18 for lowering into and removing from the interconnected pipe sections. Mandrel 60 and all other mandrels, sleeves and the like comprising the present tool are of a diameter substantially smaller than the inner diameter of the pipe sections to be tested to provide a radial clearance therebetween. Mandrel 60 is threadedly connected with low pressure packer mandrel 62 about which is located first packer 50 of the illustrated embodiment. Packer mandrel 62 is threadedly interconnected with a long, hollow extension sleeve 64 whose length is determined by the length of drill pipe sections to be tested. It is desirable that the packers all be located near the pipe joints and those skilled in the art can easily provide sleeves, mandrels and the like of appropriate length to accomplish this for the pipe sections to be tested. Sleeve 64 should be of sufficient length so that the packer mandrels and packers threadedly connected at either end thereof are located near the ends of the pipe sections. Sleeve 64 is threadedly connected at its opposite end with low pressure packer mandrel 66. Packer mandrel 66 is threadedly connected to mandrel 68 which in turn is threadedly connected to short hollow sleeve section 70 and mandrel 72 for passage through a joint 26 of the interconnected pipe sections. Mandrel 72 is threadedly connected with high pressure packer mandrel 74, having a diameter somewhat greater than that of the low pressure packer mandrels, e.g., 62 and 66. High pressure packer mandrel 74 is threadedly connected at its lower end to hollow, extension sleeve 64. In the illustrated embodiment intermediate extension sleeve 64 is threadedly connected at its lower end with low pressure packer mandrel 66 located so as to be adjacent to the next pipe joint 26. Mandrel 66 is threadedly connected with mandrel 68, hollow sleeve 70 and low pressure packer mandrel 76 for passage through final pipe joint 26. Finally, low pressure mandrel 76 is threadedly connected with lowermost low pressure packer mandrel 78 which in turn is threadedly connected with end cap 80.

A test apparatus 10 in accordance with that illustrated in FIGS. 2A-2E and partially described above is useful in simultaneously pressure testing the integrity of the joints and pipe walls of two interconnected pipe sections 20 attached to the top of a drill string. Each additional set of mandrels and sleeves 66, 68, 70, 72, 74 and 64 and their associated packers and internal fluid passage means located between sleeve 64 and mandrel 66 of FIG. 2D would permit the simultaneous testing of an additional pipe section.

The conduit means includes therein one or more fluid flow passageways for conducting pressurizing fluid to set the packers and test fluid to pressurize the annular test chambers formed by the setting of the packers. Any number of such fluid passageways may be provided, including one such passageway for each test chamber and each packer. However, the space available and connection difficulties limit the number which are conveniently used. It is convenient to set all the packers from a single fluid passageway. Further, because there are few leaks discovered, it is convenient to test all of the joints with one fluid passageway system and all of the pipe walls with another. Accordingly, it has been found that satisfactory result are generally obtained with two or three fluid passageways. In a preferred embodiment, a first fluid passageway 82 extends generally longitudinally through apparatus 10 and comprises a plurality of interconnected conduits and connecting chambers such as chamber 88. First fluid passageway 82 provides a means for setting all of the packers of tool 10 with an appropriate fluid, preferably water. In fact, in one embodiment, fluid passageway 82 is employed to conduct the pressure testing fluid to pipe wall testing annular chambers 32 and 34. In the presently illustrated embodiment, passageway 82 simply conducts the pressure testing fluid to chambers 34. A pressure testing fluid, preferably water, is conducted to chamber 32 via generally longitudinal fluid passageway 104 and generally radial exit port 106.

In the presently preferred embodiment, the integrity of joints 26 is determined using a single phase inert gas, preferably nitrogen, provided through generally longitudinal passageway 100 and generally radial ports 102.

Setting of the low pressure packers 50 is conveniently discussed with reference to FIG. 2A. Fluid under pressure enters testing apparatus 10 through passageway 82. This fluid passes through generally radial passage 84 into setting chamber 86 of packer 50. Setting chamber 86 is formed between slidable sleeve 90 and low pressure packer mandrel 62. As the fluid pressure increases, the size of chamber 86 increases, moving sleeve 90 outwardly from shoulder 89. Packer 50 further comprises packer rings 94, 92, resilient packer elements 94 of a resilient material such as rubber, neoprene or other material impervious to well bore fluids and stop ring 96. As cylindrical packer sleeve 90 moves away from shoulder 89, resilient packer rings 94 are compressed and forced outwardly into engagement with the inner wall of pipe sections 20. In the presently illustrated embodiment, all similar packers 50 are engaged simultaneously at a single predetermined pressure, such as 1200 psi.

In the presently preferred embodiment, a second group of high pressure packers 52 are engaged and set at a second, higher predetermined pressure such as 2000 psi. As illustrated, high pressure packer mandrel 74 is of a significantly greater diameter than that of the various low pressure packer mandrels 62, 66, 76 and 78. FIGS. 5 and 2C illustrate the high pressure packer unit of the present invention in the retracted and set positions, respectively. The high pressure packer mandrel includes generally radial setting port 184 to conduct the setting fluid from fluid passageway 82 into setting chamber 186. As setting chamber 186 fills with fluid, cylindrical sleeve 190 moves away from shoulder 189 moving therewith packer rings 192 and compressing resilient packer elements 194 between packer rings 192 and stop ring 196.

In the presently preferred embodiment, the movement of cylindrical sleeve 190 and the setting of packers 52 results in the opening of generally radial passage 180 having restriction 182 through which fluid passage 82 is brought into fluid communication with the resulting annular chamber 34. Accordingly, annular chamber 34 is pressurized only after the setting of all of packers 50 and 52. Cylindrical sleeve 190 further includes a small passageway 198 near the end thereof for relieving the pressure from passageway 180 as the pressure is reduced and sleeve 190 moves toward shoulder 188. Without such a pressure relief vent O-ring 178 is likely to be displaced from its associated groove by the end of sleeve 190.

The foregoing description of the invention has been directed primarily to a particular preferred embodiment in accordance with the requirements of the patent statutes and for purposes of explanation and illustration. It will be apparent, however, to those skilled in the art, that many modifications and changes in the specifically described and illustrated apparatus and method may be made without departing from the scope and spirit of the invention. For example, while the disclosure of the present method and apparatus has been described primarily with regard to the preferred embodiment and illustrated in connection with an apparatus for simultaneously testing two or three interconnected pipe sections, it will be appreciated that a testing apparatus of any length for testing of a plurality of interconnected pipe sections may be constructed by employing a plurality of intermediate sections 16 together with top section 12 and bottom section 14. Further, those skilled in the art will be able to provide various combinations of fluid passageways as desired. Therefore, the invention is not restricted to the particular form of construction illustrated and described, but covers all modifications which may fall within the scope of the following claims.

It is Applicant's intention in the following claims to cover such modifications and variations as fall within the true spirit and scope of the invention.

What is claimed is:

1. A pipe testing apparatus suitable for simultaneously but separately testing the joint and wall portions of a plurality of interconnected pipe sections, comprising:

an elongated cylindrical body having an outer diameter smaller than the inner diameter of the pipe sections into which said body is designed to be introduced for providing a radial clearance between said body and the inner surface of said pipe sections;

a plurality of first packer means spaced longitudinally along the external surface of said body, said first packer means when relaxed having outer diameters smaller than the diameter of said inner surface for providing said radial clearance, said first packer means sufficiently expandable to sealingly engage said inner surface for producing a plurality of annular test chambers about said body and within said interconnected pipe sections;

a plurality of second packer means spaced longitudinally along said external surface of said body, each spaced between two of said first packer means, each when relaxed having an outer diameter smaller than said inner diameter for providing said radial clearance, each sufficiently expandable to sealingly engage said inner surface for dividing one of said annular test chambers into two adjacent chambers, one of said adjacent chambers suitable for testing a pipe section wall, the other of said adjacent chambers suitable for testing a joint between pipe sections;

means for conducting a liquid through said body and into fluid communication with said first and second packer means and with a plurality of closed ports, each of said ports in fluid communication with the exterior of said body;

means for pressurizing said liquid to a first predetermined pressure at which said first packer means is expanded and set, means for pressurizing said liquid to a second and higher predetermined pressure at which said second packer means is expanded and set only while said first packer means are in sealing engagement, and means for pressurizing said liquid to a predetermined wall test pressure below which each of said ports is opened causing each of said chambers suitable for testing a pipe section wall to fill with said liquid at said predetermined wall test pressure;

means for conducting a gas through said body and through a plurality of ports in said body to the exterior of said body;

means for pressurizing said gas to a predetermined joint test pressure to fill each of said chambers suitable for testing a joint between pipe sections with said gas at said predetermined joint test pressure; and means for detecting a decrease in said predetermined test pressures indicative of a loss of test fluid through a leak.

2. A pipe testing apparatus suitable for simultaneously but separately testing the joint and wall portions of a plurality of interconnected pipe sections, comprising:

an elongated cylindrical body having an outer diameter smaller than the inner diameter of the pipe sections into which said body is designed to be introduced for providing a radial clearance between said body and the inner surface of said pipe sections;

a plurality of first packer means spaced longitudinally along the external surface of said body, said first packer means when relaxed having outer diameters smaller than the diameter of said inner surface for providing said radial clearance, said first packer means sufficiently expandable to sealingly engage said inner surface for producing an annular test chamber about said body and within said pipe sections;

a second packer means spaced along said external surface of said body between two of said first packer means, said second packer means when relaxed having an outer diameter smaller than said inner diameter for providing said radial clearance, said second packer means sufficiently expandable to sealingly engage said inner surface for dividing said annular test chamber into two adjacent chambers, one of said adjacent chambers suitable for testing a pipe section wall, the other of said adjacent chambers suitable for testing a joint between pipe sections;

means for expanding said first packer means into sealing engagement with the inner surface of said pipe sections;

means for expanding said second packer means into sealing engagement with the inner surface of said pipe sections only while said first packer means are in said sealing engagement; and means for conducting a fluid to the exterior of said body for pressurizing said adjacent chambers.

3. The pipe testing apparatus of claim 2 further comprising:

means for pressurizing each of said adjacent chambers to a predetermined test pressure with a fluid; and means for detecting a decrease in said predetermined test pressure indicative of a loss of said fluid through a leak.

4. The pipe testing apparatus of claim 2 comprising a plurality of means for conducting fluid to said adjacent chambers wherein first means for conducting fluid communicates a first fluid to said chamber suitable for testing a pipe section wall and second means for conducting fluid communicates a second fluid to said chamber suitable for testing a joint between pipe sections.

5. The pipe testing apparatus of claim 2 comprising a plurality of second packer means.

6. The pipe testing apparatus of claim 2 comprising conduit means through said body for communicating a fluid to said packer means; and means for pressurizing said fluid in said conduit means for expanding and setting said packer means.

7. The pipe testing apparatus of claim 6 wherein said packer means expand in response to an increase in the pressure of the fluid in said conduit means.

8. The pipe testing apparatus of claim 7 wherein the pressure of the fluid in said conduit means necessary to expand said second packer means is greater than the pressure necessary to expand said first packer means into sealing engagement with the inner surface of said pipe sections.

9. The pipe testing apparatus of claim 8 wherein a single conduit means is in fluid communication with all of said first and second packer means.

10. The pipe testing apparatus of claim 9 wherein said conduit means also provides a conduit means through said body for communicating the fluid used to set said packer means with said chamber suitable for testing a pipe section wall.

11. The pipe testing apparatus of claim 10 also comprising a second conduit means through said body for providing communication of a fluid to said chamber suitable for testing a joint between pipe sections.

12. A method for simultaneously but separately testing the joint and wall portions of a plurality of interconnected pipe sections, comprising:

positioning within the interior of said interconnected pipe sections a pipe testing apparatus;

expanding a plurality of first packer means spaced longitudinally along the external surface of said apparatus into sealing engagement with the inner surface of said pipe sections to produce at least one annular test chamber about said apparatus and within said pipe sections;

expanding into sealing engagement with the inner surface of said pipe sections, while said first packer means are in said sealing engagement, second packer means spaced longitudinally along the external surface of said apparatus between two of said first packer means, each of said second packer means dividing one of said annular test chambers into two adjacent chambers, one of said adjacent chambers suitable for testing a pipe section wall, the other of said adjacent chambers suitable for testing a joint between pipe sections;

pressurizing, after said packer means are expanded, said adjacent chambers to a predetermined test pressure with a fluid; and detecting a decrease in said predetermined test pressure indicative of a loss of said fluid through a leak.

13. The method of claim 12 comprising expanding a plurality of second packer means.

14. The method of claim 12 comprising expanding said packer means by pressurizing a fluid in pressure communication with said packer means.

15. The method of claim 14 comprising expanding said first and second packer means by pressurizing the fluid in a fluid conduit means in pressure communication with all of said packer means.

16. The method of claim 15 comprising pressurizing to a predetermined test pressure said chamber suitable for testing a pipe wall section with said fluid in pressure communication with said packer means.

17. The method of claim 12 comprising opening a port through which said chamber suitable for testing a pipe wall section is pressurized by expanding said second packer means.

18. The method of claim 12 comprising increasing the pressure of a first fluid in a single conduit means to a first predetermined pressure to expand and set said first packer means and to a second and higher predetermined pressure to expand and set said second packer means.

19. The method of claim 18 comprising further increasing the fluid pressure in said conduit means to pressurize said chamber suitable for testing a pipe wall section to a predetermined test pressure with said first fluid and pressurizing said chamber suitable for testing a joint between two pipe sections with a second fluid.

20. The method of claim 19 wherein said first fluid is a liquid and said second fluid is a gas.

* * * * *